(12) United States Patent
Grealish et al.

(10) Patent No.: US 7,505,995 B2
(45) Date of Patent: Mar. 17, 2009

(54) OBJECT-RELATIONAL MODEL BASED USER INTERFACES

(75) Inventors: Kevin D. J. Grealish, Seattle, WA (US); Reid B. Gustin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/428,300

(22) Filed: Jun. 30, 2006

(65) Prior Publication Data

US 2008/0005161 A1    Jan. 3, 2008

(51) Int. Cl.
G06F 17/30    (2006.01)

(52) U.S. Cl. .................... 707/103 R; 707/102

(58) Field of Classification Search ............. 707/10, 707/102, 103 R, 103 X, 103 Y, 103 Z; 717/120, 717/162, 165, 170, 176; 706/11; 715/700, 715/753, 762, 853; 719/316; 753/762, 853
See application file for complete search history.

(56) References Cited

U.S. PATENT DOCUMENTS

| | | | |
|---|---|---|---|
| 6,014,138 A | 1/2000 | Cain et al. | 345/335 |
| 6,073,242 A | 6/2000 | Hardy et al. | 713/201 |
| 6,141,003 A | 10/2000 | Chor et al. | 345/327 |
| 6,362,892 B1 | 3/2002 | Lee et al. | 358/1.13 |
| 6,785,686 B2 | 8/2004 | Boreham et al. | 707/102 |
| 6,910,208 B1 | 6/2005 | Zimniewicz | 717/174 |
| 6,965,902 B1 | 11/2005 | Ghatate | 707/103 |
| 2003/0107591 A1 | 6/2003 | Jameson | 345/744 |
| 2003/0226111 A1 | 12/2003 | Wirts et al. | 715/514 |
| 2004/0015858 A1 | 1/2004 | Seto et al. | 717/120 |
| 2004/0193388 A1 * | 9/2004 | Outhred et al. | 703/1 |
| 2004/0199572 A1 * | 10/2004 | Hunt et al. | 709/201 |
| 2004/0205179 A1 * | 10/2004 | Hunt et al. | 709/223 |

(Continued)

FOREIGN PATENT DOCUMENTS

WO    WO 2005/103874    11/2005

(Continued)

OTHER PUBLICATIONS

"Role-Based User Interfaces for Livelink," Formark Ltd., 2003-2005, available at http://www.formark.com/technology/role-based_ui/.

(Continued)

Primary Examiner—Diane Mizrahi
(74) Attorney, Agent, or Firm—Workman Nydegger

(57) ABSTRACT

Embodiments provide for a dynamically generated UI management tool, which is part of a hierarchical, layered system built on top of an object-relational model. It provides both common model types for system modeling, as well as transaction engines. The transaction engines allow for such things as discovery of objects within a live system into an instant space and synchronization of the instant space back to the live system, which may then be used when committing requested changes to objects. Upon gathering of object-relational information within the system, the UI can be dynamically generated showing derived relationships between objects, settings, parts, or attributes for the system, without requiring the general framework to have specific knowledge of the types, relationships, and what should be displayed. As such, a change to the specific types does not require a change to the general framework.

26 Claims, 9 Drawing Sheets

U.S. PATENT DOCUMENTS

| | | | |
|---|---|---|---|
| 2004/0264782 A1 | 12/2004 | McKnight et al. | 382/229 |
| 2005/0044269 A1 | 2/2005 | Abdelkrim | 709/238 |
| 2005/0057560 A1 | 3/2005 | Bibr et al. | 345/418 |
| 2005/0138031 A1 | 6/2005 | Wefers | 707/9 |
| 2005/0138419 A1 | 6/2005 | Gupta et al. | 713/201 |
| 2005/0159969 A1 | 7/2005 | Sheppard | 705/1 |
| 2005/0193361 A1 | 9/2005 | Vitanov et al. | 716/19 |
| 2005/0210397 A1 | 9/2005 | Kanai et al. | 715/762 |
| 2006/0106585 A1* | 5/2006 | Brown et al. | 703/1 |
| 2006/0271341 A1* | 11/2006 | Brown et al. | 703/1 |

FOREIGN PATENT DOCUMENTS

WO    WO 2005/109278    11/2005

OTHER PUBLICATIONS

Egede et al., "*Ganga User Interface for Job Definition and Management*," Imperial College of London, available at http://www.gridpp.ac.uk/papers/ah05_ganga.pdf, date: ah05 is Jul. 4, 2005.

"*Novell iManager: Planning Security for Delegated Administration*," Novell, Inc., 2003, available at http://www.novell.com/collateral/4621360/4621360.html#top.

Brad A. Myers, "*The Case for an Open Data Model*," Carnegie Mellon University, 1998, available at http://reports-archive.adm.cs.cmu.edu/anon/1998/CMU-CS-98-153.pdf.

Olsen et al., "*The Future of User Interface Design Tools*," Stanford University, available at http://hci.stanford.edu/srk/chi05-ui-tools/UI-Tools-AllPapers.pdf, date: chi05 is Mar. 15, 2005.

Jacob et al., "*A Software Model and Specification Language for Non-WIMP User Interfaces*," Tufts University, 1999, available at http://portal.acm.org/citation.cfm?id=310642.

Mark Green, "*User Interface Tools for Adaptive and Robust User Interfaces*," School of Creative Media, City University of Hong Kong, available at http://hci.stanford.edu/srk/chi05-ui-tools/UI-Tools-AllPapers.pdf, date: chi05 is Jan. 3, 2005.

Scott E. Hudson, "*Leveraging 1,000 and 10,000-Fold Increases: Considering the Implications of Moore's Law on Future IU Tools Research*," HCI Institute, Carnegie Mellon University, available at http://hci.stanford.edu/srk/chi05-ui-tools/UI-Tools-AllPapers.pdf, date: chi05 is Jan. 10, 2005.

Myers et al., "*More Natural and Open User Interface Tools*," Human-Computer Interaction Institute, Carnegie Mellon University, available at http://hci.stanford.edu/srk/chi05-ui-tools/UI-Tools-AllPapers.pdf, date: chi05 is Jan. 7, 2005.

Nichols et al., "*Automatic Interface Generation and Future User Interface Tools*," Human-Computer Interaction Institute, Carnegie Mellon University, available at http://hci.stanford.edu/srk/chi05-ui-tools/UI-Tools-AllPapers.pdf, date: chi05 is Jan. 7, 2005.

Li et al., "*Rapid Prototyping Tools for Context-Aware Applications*," University of California, Berkeley, available at http://hci.stanford.edu/srk/chi05-ui-tools/UI-Tools-AllPapers.pdf, date: chi05 is 4-405.

Cuppens et al., "*CoGenIVE: Code Generation for Interactive Virtual Environments*," Limburgs Universitaire Centrum—Expertise Centre for Digital Media, available at http://hci.stanford.edu/srk/chi05-ui-tools/UI-Tools-AllPapers.pdf, date: chi05 is Jan. 4, 2005.

Anind K. Dey, "*End-User Programming: Empowering Individuals to Take Control of Their Environments*," HCI Institute, Carnegie Mellon University, available at http://hci.stanford.edu/srk/chi05-ui-tools/UI-Tools-AllPapers.pdf, date: chi05 is Jan. 5, 2005.

Michel Beaudouin-Lafon, "*Interactions as First-Class Objects*," Université Paris-Sud, available at http://hci.stanford.edu/srk/chi05-ui-tools/UI-Tools-AllPapers.pdf, date: chi05 is Jan. 9, 2005.

Bouchet et al., *A Component-Based Approach: ICARE Workshop: The Future of User Interface Design Tools*, University of Grenoble 1, available at http://hci.stanford.edu/srk/chi05-ui-tools/UI-Tools-AllPapers.pdf, date: chi05 is Jan. 3, 2005.

Dow et al., "Tools for Designing Computational Spaces," Georgia Institute of Technology, available at http://hci.stanford.edu/srk/chi05-ui-tools/UI-Tools-AllPapers.pdf, date: chi05 is Jan. 4, 2005.

Shaer et al., "*Toward a Software Model and a Specification Language for Next-Generation User Interfaces*," Computer Science Department, Tufts University, available at http://hci.stanford.edu/srk/chi05-ui-tools/UI-Tools-AllPapers.pdf, date: chi05 is Jan. 3, 2005.

Navarre et al., *What User Interface Tools are Needed for Safety Critical Interactive Systems?*, University Toulouse 3, available at http://hci.stanford.edu/srk/chi05-ui-tools/UI-Tools-AllPapers.pdf, date: chi05 is 2-21-5.

Pierce et al., "*Tool Support for Divisible Interfaces*," College of Computing, Georgia Institute of Technology, available at http://hci.stanford.edu/srk/chi05-ui-tools/UI-Tools-AllPapers.pdf, date: chi05 is Jan. 3, 2005.

Angel Puerta, "*A Better Future for UI Tools Through Engineering*," RedWhale Software, available at http://hci.stanford.edu/srk/chi05-ui-tools/UI-Tools-AllPapers.pdf, date: chi05 is Jan. 14, 2005.

\* cited by examiner

OBJECT-RELATIONAL MODEL BASED USER INTERFACES

CROSS-REFERENCE TO RELATED APPLICATIONS

N/A

BACKGROUND

Although computers were once isolated and had minimal or little interaction with other computers, today's computers interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scale networks, and the wide-spread availability of low-cost personal computers, has fundamentally changed the way that many people work, interact, communicate, and play.

Using similar communication networks as those described above, distributed systems provide a decentralized and parallel computing combination of hardware and/or software resources that communicate to accomplish a common objective or task. The types of hardware, programming languages, operating systems, and other resources may vary drastically from system to system. One of the main goals of a distributed computing system is to connect users and resources in a transparent, open, and scalable way. Ideally this arrangement is drastically more fault tolerant and more powerful than many combinations of stand-alone computer systems.

Each resource in a distributed system must be configured and appropriately managed to ensure proper operation and compatibility with the other components in the system. From an administrative standpoint, such tasks can become quite complex depending on the skill set of the administrator, the complexity of the system, and other factors. In order to assist in this and other similar management operations, utilities such as consoles and other user interfaces have been developed for providing a framework in which collections of administrative tools can be created, saved, and opened. Such tools are used to configure objects, monitor state, or otherwise manage hardware, software, and/or networking components. These and other tasks are performed by providing items such as controls, wizards, documentation, and snap-ins, which may be from any number of various software vendors and/or user defined. Often, however, these utilities differ from application to application—mostly in terms of size, complexity, and functionality.

As the clusters of components (such as services) within a distributed system increase, so too does the need for administrator access to the management functionality of each component. In addition, as the complexity of hardware and/or software grows, richer interaction between objects in the system is needed. Consequently, a formal framework for installing, configuring, and managing components is needed, where increasing the number of components represented in the system does not mean a change in the core framework. Also, it is important to provide much richer interfaces to administrators both to ease management of individual objects, and to give better information about interactions between them.

As the clusters of components (such as services) within a distributed system increase, so too does the need for administrator access to the management functionality of each component. In addition, as the complexity of hardware and/or software grows, richer interaction between objects in the system is needed. Consequently, a formal framework for installing, configuring, and managing components is need, where increasing the number of components represented in the system does not mean a change in the core framework. Also, it is important to provide much richer interfaces to administrators both to ease management of individual objects, and to give better information about interactions between them.

BRIEF SUMMARY

The above-identified deficiencies and drawbacks of current management tools for distributed systems are overcome through example embodiments of the present invention. For example, embodiments described herein provide for object-relational model based user interface of a management tool in order to allow for ease in extending components thereof Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

For example, embodiments provide for executing a management tool that provides a general framework for controlling objects within a distributed system. The general framework is part of hierarchical layered system built on top of an object-relational model, which defines relationships between objects, settings, parts, or attributes within and across various types within a type space of a distributed system. Object-relational information is then received based on the object-relational model when controlling the objects within the type space using the management tool. Also note that at least a portion of the object-relational information is received from type specific code developed outside the general framework. Based on the received object-relational information, a user interface is dynamically generated that displays the structure of components derived from relationships between the objects, settings, parts, or attributes. Such user interface is generated without requiring the general framework to have encoded therein specific knowledge of the types, relationships, and what should be displayed such that changes to specific types in the type space do not require a change to the general framework.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
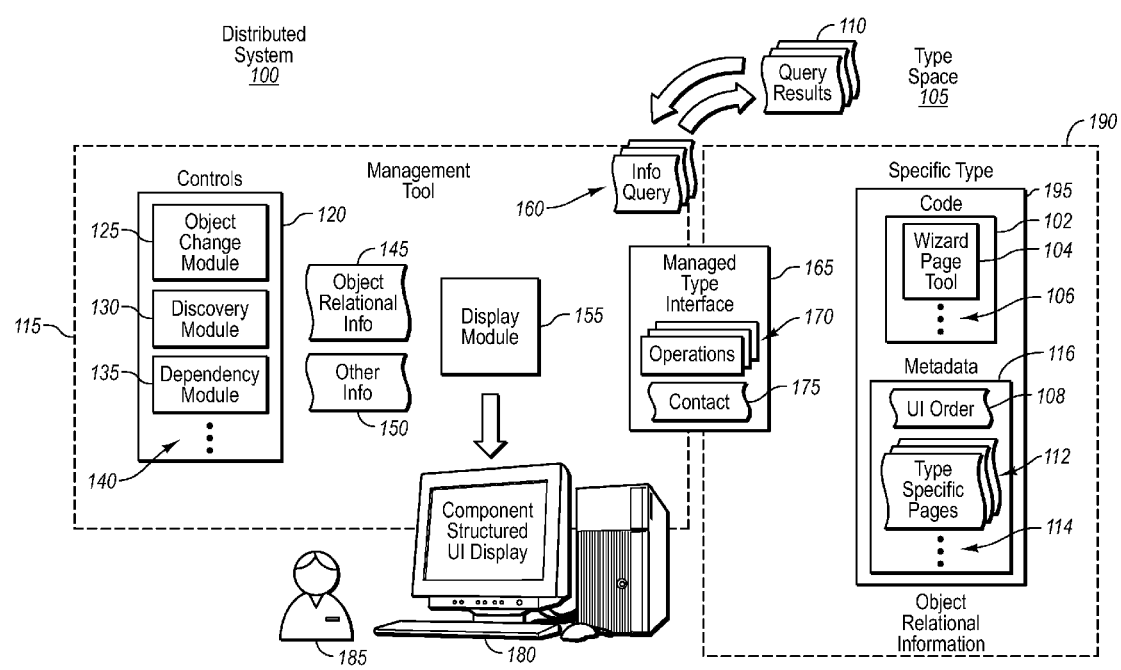
FIG. 1 illustrates a distributed system that dynamically generates an object-relational model based user interface in accordance with example embodiments.

The present invention extends to methods, systems, and computer program products for dynamically generating object-relational model based user interface (UI) for a management tool. The embodiments of the present invention may comprise a special purpose or general-purpose computer including various computer hardware or modules, as discussed in greater detail below.

Embodiments herein provide for a dynamically generated UI management tool for controlling objects within a distributed system. The general framework is part of a hierarchical, layered system built on top of an object-relational model (e.g., System Definition Model (SDM)), which is implemented in a runtime that provides a type space containing types for relationships and objects. The runtime further includes an instance space that comprises individual instantiations of those types. The management tool infrastructure built on top of this object-relational model runtime provides both common model types for system modeling, as well as transaction engines. The transaction engines allow for such things as discovery of objects within a live system into an instance space and synchronization of the instance space back to the live system, which may be used when committing requested changes to objects. In addition, the object-relational model (e.g., SDM) runtime provides the ability to declare constraints that will fire conditionally based on the contents and settings in the instant space.

A "model" as used herein is a logical description of a system (e.g., a computer operating system, a car, an organization, a building infrastructure, etc.) that can be reasoned over. For example, one specific use of such models is for representing software of an operating system within a distributed environment. The modeling might contain information about operating system settings, components that are installed, and applications that can be installed on such operating system.

As the name implies, the two base concepts of an object-relational model are the object and the relationship—where objects can be used to represent any logical grouping of data; relationships are used to represent connections between these objects. Note that an object can also have settings, parts, attributes, or the like, which represent other objects that can make up the comprised object. As previously mentioned, inconsistencies across various configuration or management tools as well as the inability to easily extend these mechanisms are motivating factors for embodiments that provide user interface (UI) based on object-relational modeling systems. More specifically, embodiments provide for dynamically generating a user interface that displays structure of components derived from the relationships between objects, without requiring the general framework to have encoded therein specific knowledge of the types, relationships, and what should be displayed.

As such, changes to a specific type in the type space do not require a change to the general framework. Moreover, the framework, if it has encoded therein specific knowledge of the type in the runtime type space, may decide when and where to display configuration pages. The actual pages, however, that are displayed for specific type are determined by the developer that writes specific code based on such object-relational model. Note that even if the framework doesn't have encoded therein specific knowledge of a type, other embodiments provide for UI with very low-levels of types (like object), which can then derive the structure of the UI based on the structure of the models.

For example, in another example embodiment the user interface or management tool framework is built around roles as a logical unit, which may include a web server role, printer role, domain name server role (DNS), etc. Accordingly, a role developer can create an object-relational model (e.g., SDM) package that describes the structure of the role as well as how the role is installed and uninstalled. In other words, provided herein is a more formal definition of a role, which allows the role developer to customize the information presented by and about the role; while still playing a part in the more broadly scope user interface. Accordingly, the management tool framework decides when and where user interface from the role is displayed, but the code for the individual role decides exactly what is shown to the user. As a specific example, the role management tool console may have a section used to display summary information. When the user is managing a particular role, this section may be used to display the role's management homepage. The framework decides when to show the management homepage for this particular role, but the content of that homepage will typically be left up to the developer for the individual role.

In addition to the user interface shown for the role based on specific knowledge encoded within the framework, roles may also have object-relational information associated with them such as metadata and metadata behavior. This may include simple data like a flag specifying whether the role is permanent, as well as more complicated behavior, like deciding if a role can be installed at the same time as another role or object within the framework. The role management tool can then make decisions and show the UI that has detailed information about roles, without any knowledge built into the framework about such individual roles or specific types. Of course, as will be described in greater detail below, embodiments extend beyond specific types of roles and can be utilized in any form of type space as provided herein. Also, other embodiments extend beyond simple display of homepages, to full wizards and a series of pages that can guide user through configuration and other management of the various types and objects as will be described in greater detail below.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

As described in greater detail below, embodiments provide for controls that present types to the user based on object-relational models, which define types by giving a name to a collection of objects, settings, parts, attributes, etc. In other words, a type includes objects as well as other settings, parts, and attributes to compose the type. Types may take on many forms, and types can include other types. For example, a "base type" can be broadly defined wherein a "specific type" will inherit properties from the general base type. A "concrete type" can further inherit properties from the specific type as well as the underlying based type. As a specific example, a role might define a base type with such things as a name, sub-features, fields, etc. A printer role, might define a more specific type that inherits the properties noted above as well as gives more specific detail and potentially additional properties for further defining the printer role. The type that is instantiated of such printer role may be a more concrete example of a specific type of role, thus further defining and inheriting from those types in the hierarchical relationship.

Of course, there are many different types and depending upon how they are defined, types may reside anywhere within the hierarchical relationship mentioned above. For example, a role (defined above as a base type) can be a specific type that inherits from a base type of, e.g., a software application. As can be seen, what constitutes any particular type may depend on several factors including the type space, how broadly defined the base type or other categories are, etc. Accordingly, the use of any specific reference for a particular type and any type category as used herein is for illustrative purposes only. Further, the general term "type" is used herein to define any category of type unless explicitly defined as a hierarchical base, specific, concrete, or other type. Further note, that there may be any number of hierarchical type relationships. For example, each of these categories may further have sub-types, which subtypes may further have sub-types and so on and so forth.

The general term "type space" broadly defines all types that are available within a given distributed system. The object-relational model (e.g., SDM) is a model used to create definitions of types in a distributed system, which may simply be defined as a set of related software and/or hardware resources working together to accomplish a common function. Multi-tier, line-of-business (LOB) applications, roles such as web services, print services, domain name servers (DNS), e-commerce sites, enterprise data centers, security systems, and others are just a few examples of such distributed system types. Using object-relational models, businesses or other companies can create blue prints of an entire system, which can be manipulated with various software tools as described herein, which are used to define system elements and capture data pertinent to development, deployment, and other operations.

More specifically, embodiments herein provide for a user interface (UI) that is built on top of object-relational models. This UI is dynamically created for management tools used for manipulating type instances within the runtime model. FIG. 1 illustrates a distributed system 100 with a management tool 115 used to dynamically create component structure UI display 180 based on object-relational information. Prior to discussing the application in great detail, however, it should be noted that although embodiments herein are described in terms of a management tool 115, embodiment may also be practiced in other types of tools as well. In addition, a management tool 115 as defined herein should be broadly construed to apply to any type of application used for such things as configuration of components, state monitoring for an object, system extensions, or any other related administrative tasks or operations. Further, the types of components or objects managed may correspond to any number of various objects within a distributed environment 100 of related hardware resources and/or software resources. Accordingly, any specific use or type of management tool 115 or any specific component or object controlled thereby is used herein for illustrative purposes only and is not meant to limit or otherwise narrow embodiments herein unless otherwise explicitly claimed.

Regardless of the type or use of management tool 115, as shown, a type space 105 is provided and may include any number of specific types 190 as defined herein above. For example, a type space 105 that includes roles may have a specific type 190 for a printer, web server, terminal server, directory service, or any other specific type. Each specific type 190 may include object-relational information 195 that will be used as described in greater detail below for dynamically generating UI 180. Such object-relational information 195 may include metadata, metadata behavior, or other information. For example, the object-relational information 195 may include the code 102 for such things as a wizard page tool 104, which can be used as a control for determining what web pages are shown to a user (described in greater detail below). Of course, other code 106 such as controls described herein can also be used, which may be any well known code for generating UI 180 or assisting in displaying UI 180 as described herein.

Along with the code 102, object-relational information 195 can include metadata or metadata behavior 116. Such metadata 116 may include things such as the UI order 108, which indicates in what order (i.e., $1^{st}$, $2^{nd}$, last, etc.) a representation (e.g., the name, icon, etc.) of the specific type 190 may appear in a list to a user 185 on the UI display 180. Such functionality may be useful when using discovery control 130 as described below. Other metadata may include type specific pages 112 that can be used by the wizard page tool 104 when generating UI display 180. Such pages 112 can be used when guiding a user through the series of setup or other procedures. Still other metadata 116 may include such objects as a flag that indicates that the specific type 190 is permanent or any other metadata 114 or marker as will be described herein. Of course, there may be any number of types and/or uses of such metadata 116 and/or code 102. As such, these and other examples of such object-relational information 195 are used herein for illustrative purposes only and are not meant to limit or otherwise narrow the scope of embodiments herein unless otherwise explicitly claimed.

Regardless of the type or specific use of the object-relational information 195, management tool 115 will typically communicate with the specific types 190 through a managed type interface 165. Such interface 165 defines a series of operations 170 using, e.g., a contract 175 for which the specific type 190 is based. In other words, the contract 175 is used as a basis for the design details for a developer who generates a specific type 190 based on the object-relational model defined herein. The operations 170 can be used to retrieve the object-relational information 195 such as the code 102 and metadata 115, as well as performing other functions as will be described in greater detail below. For example, the managed type interface 165 can be used for sending info query 160 to retrieve such object-relational information 195 from the specific type 190, as well as obtain other query results 110 within the type space 105 of the distributed system 100. Such query results 110 and/or object-relational information 195 retrieved can be any well known results or information as will be described herein for generating the UI 180 display based on the object-relational model.

Management tool 115 may be developed with the specific knowledge of specific types 190 within the type space 105. In such an event, it becomes possible to generate controls 120 that can be used for further developing the object-relational information 145 to give richer structure around the component structured UI display 180. For example, when developing the management tool 115 UI that has specific knowledge of a specific type 190 it is possible to have controls 140 (e.g., discovery module 130) that are able to identify specific types 190 and display initial values (e.g., state, name, ordering, etc.) for these particular types 195. Also, if the model contains relationships in addition to object definitions, it becomes possible for the UI 180 to reflect the relationship types as well.

As an explicit example, assume UI 180 is dynamically generated using the object-relational information 195 for selecting computer operating system components for installation. Given a type space 105 that includes object-relational information 145, 195 for definitions for the different versions of the operating system, the different components that are available, and relationships declaring which components can be installed on which version, the management tool 115 can do filtering over the type space 105. The UI 180 can then present to the user only the list of components which are available for installation on the current operating system.

More specifically, the above component list presentation based on operating system versioning may be done in the management tool 115 by populating the type space 105 with all of the possible types—i.e., with knowledge about the specific types 190. The infrastructure (as described below, e.g., discovery module 130, or other component) may then be called to discover which operating system version is on the machine. From that point, the management tool 115 is able to create a set of components which are the potential components for the current machine. The infrastructure or management tool 115 is then called to discover (e.g., using discovery module 130) which components are already installed. After that, the user 185 can be shown a list of all components for the machine, with an indication (e.g., check mark in a box, radio button, highlighting, etc.) of which components are already installed and which are available to be installed.

Note that because the UI 180 is generated based on the object-relational model or information 145, 195, the management tool 115 or infrastructure does not necessarily need explicit information about each specific type 190. All that was needed in this was a general knowledge about the existence of each the specific type 190 or component and that a relationship exists between the components and the versioning of the operating system in order to query 160 the type space 105 for such results 110 used in generating the object-relational information 145 for dynamically building the UI. As will be described in greater detail below, however, UI 180 can also be dynamically generated with little or no coded knowledge of specific types 190 within the type space 105, depending upon how rich of UI 180 is desired.

As a more general example, using the managed type interface 165, discovery module 130 (or some other component within the infrastructure) can query 160 each specific type 190 for object-relational information 195. Such information 195 may include metadata such as the UI order 180, the name for the specific type 190, a current state of whether or not an instance in the runtime has been deployed, etc. These query results 10 and other information 150 may then be used to generate object-relational information 145 to dynamically generate a list of available specific types 195 and display such to the user 185 in the display 180. Also, because the model contains relationships in addition to object definitions, it becomes possible for the UI 180 to reflect the relationship between the specific types 195 as described in greater detail below.

Note that the object-relational information 145, 195 may come from the specific type 190, from the infrastructure for object relation model, or from the management tool 115 itself In fact, the object relation information 145, 195 can be received and used from just about anywhere within the distributed system 100 and can relate to any number of objects and show numerous relationships. As such, any specific reference to where the object relation information 145, 195 comes from, the objects it describes, or relationships shown are used herein for illustrative purposes only and are not meant to limit or otherwise narrow the scope of embodiments herein described unless otherwise explicitly claimed.

In other embodiments, controls 120 that represent instances of the object-relational model runtime are provided herein. Such objects correspond to a specific type 190 within the type space 105. As such, if the controls 120 are coded with knowledge of a specific type 190, it is possible for the UI 180 to show data about the instance with visualizations that are specific to that type 190 of instance. Again, because the UI is reflecting an object-relational model the UI 180 is able to show structure to the user 185 that is derived from relationships between objects in the instance space. Accordingly, this allows the creation of specific types 190 for declaring that one type 190 can be nested inside another type 190 in a hierarchical manner. A specific example of this is a management control for an operating system component. If the model for the component has a relationship to a series of models for services (e.g., web services, printer services, etc.), the management control for the operating system component can know that these individual services need to be displayed within the management control (e.g., as an offset list underneath a heading of "Management Control") since they are part of the component. There may, however, be other instances of services in the model which would not show up because they do not have instantiated relationships.

Of course, there are other various controls 120 with knowledge of specific types 190 that can be encoded within the management tool 115. For example, object change module 125 may be used to identify when changes occur to specific types, e.g., when using wizard page tool 105 for configuring or otherwise modifying a specific type 190. Such changes (as described in greater detail below) may then be presented in a summary page that can dynamically be generated based upon such object-relational information 145 provided. Similarly, the dependency module 135 can be used to identify dependencies between objects and display this relationship as part of the component structure UI display 180. For example, if one specific type 190 or component needs to be installed upon the initiation of another installed component, UI 180 may be dynamically generated based upon the object-relational information 145, 195 received. Such UI 180 can indicate to the user 185 that a selected object needs to be installed and give the user the option to select such components for installation. Of course, there are other various controls 140 that can also be used and configured in accordance with example embodiments as will be described in greater detail below.

In addition to showing UI 180 to the user 185 based on object-relational models or information 145, 195, it is also possible to present UI 180 that allows them to manipulate instances. In such case, the user is changing settings on instances through the UI 180. Because of the object-relational model and the object-relational (e.g., SDM) runtime, the UI 180 can then validate the instances to assure that it has been given valid data. For example, the object change module 125 (or other module 140) within the infrastructure may allow for constraints that work across multiple instances through the relationships that are tracked. As a specific example, assume UI 180 is created that allows the user 185 to configure permissions on an instance of a file system. The instance when the user 185 is finished making their configuration changes, can be validated against the modeled policy of the operating system without making any changes to the operating system itself. If the validation phase succeeds, the user 180 has high confidence that they can apply the changes to their actual system without violating the machine's policy. Note that the management tool 115 can gather such object-relational information 195 for use in making such determinations, without any specific knowledge or encoded knowledge about such policies within the management tool 115 itself.

As mentioned above, other embodiments provide that because of the rich object-relational information 195 that can be gathered and captured within the management tool 115, a UI can be dynamically generated that tracks dependencies between objects. More specifically, because the dependencies for specific types 190 within the type space 105 can be modeled in the runtime (using for example dependency module 135), it becomes possible to alter the UI 185 to these dependencies when types are instantiated, rather than needing to wait for constraints to be violated.

As a specific example, assume the display of available components of an operating system described above has a component management portion where one component depends on another component. Using the control 135 that lists available components from the type space 105, the UI 180 can alert the user (e.g., through a popup window or some other icon) when one component is chosen that depends on another component. The user 180 can then be allowed to continue with their selection (and install both components) or to cancel their selection, leaving the system unchanged. This dependency prompting is available because the system has been encoded with knowledge of the dependency relationship type.

Note that such controls 120 maybe encoded within the management tool 115, or can be pulled in from the object-relational information 195 or code 102 as previously described. In any event, the management tool 115 needs to have knowledge of such operations 170 for the managed type interface 165 in order to pull the code 102 in from the specific type 190. Nevertheless, the management tool 115 in such embodiment does not need to have knowledge about the specific controls 120 pulled in, other than general knowledge that such controls are available.

In addition to other rich relational information displayed in the UI 180, by creating pages of controls with knowledge of instances, a configuration wizard can be created that allows the user 185 to make a series of changes to the instance space. Because these changes have all been made to the models in a transaction, it becomes possible to create a summary of the actions that have been taken. This summary information can then be related to the object-relational information 145, 195 for dynamically displaying summary UI 180 to the user 185 before changes are actually submitted to the instance space.

For example, as previously noted, object change model 125 can be used to monitor desired changes in the runtime, and present such changes as a summary to the user 185 before the changes are actually submitted to the instance space. The user 185 can then choose to accept the changes and commit the changes to the instance space, or to cancel the changes and leave the system unchanged. A specific example of this is a wizard that allows the user to select operating system components for installation. The user 185 can be given an opportunity to configure each of the components in a wizard. The wizard can then present a user 185 with a summary to confirm or cancel. This wizard can also include constraints in the summary (in a similar manner as mentioned above) as warnings to the user, so that the user is immediately aware of whether there are potential problems.

Other embodiments provide for type independent UI 180 driven by such object-relational models or object-relational information 195. If a UI 180 is written that has no coded knowledge about specific types 190, it may no longer be possible to provide rich user interfaces 180 that are aware of the exact types 190 being used. Nevertheless, because of the object-relational model provided by the management tool 150 runtime, UI 180 can still be written that shows structure based on the object-relational information 195. For example, if there are two specific types 190 within the type space 105 that have a relationship between them, the UI can still show that there are objects with a relationship based on the object-relational information 195. For the object and the relationship, the settings can be shown to the user 185 either for viewing or manipulating. Also, if an object has a part that is another object, a view could be created that nests the part inside other object. These concepts together allow a creation of topographic view over the instance space, without any specific types 195 being encoded into the controls 120 or infrastructure.

Note that if the management tool 115 is not type specific 190 encoded, it typically cannot present rich UI 180 based on the models (but it can certainly present a general view). Nevertheless, if the model were extended to carry the controls 120 within the object-relational information 195 retrieved from the specific types 190, the management tool 115 framework could be written that had no knowledge of types 190 beyond objects and relationships. In such case, the UI could become very rich, and type specific 190 controls (e.g., wizard page tool 104) can be written. The UI 180 for such models, however, develops separately and is plugged into the framework 115 at runtime.

Figure 2:
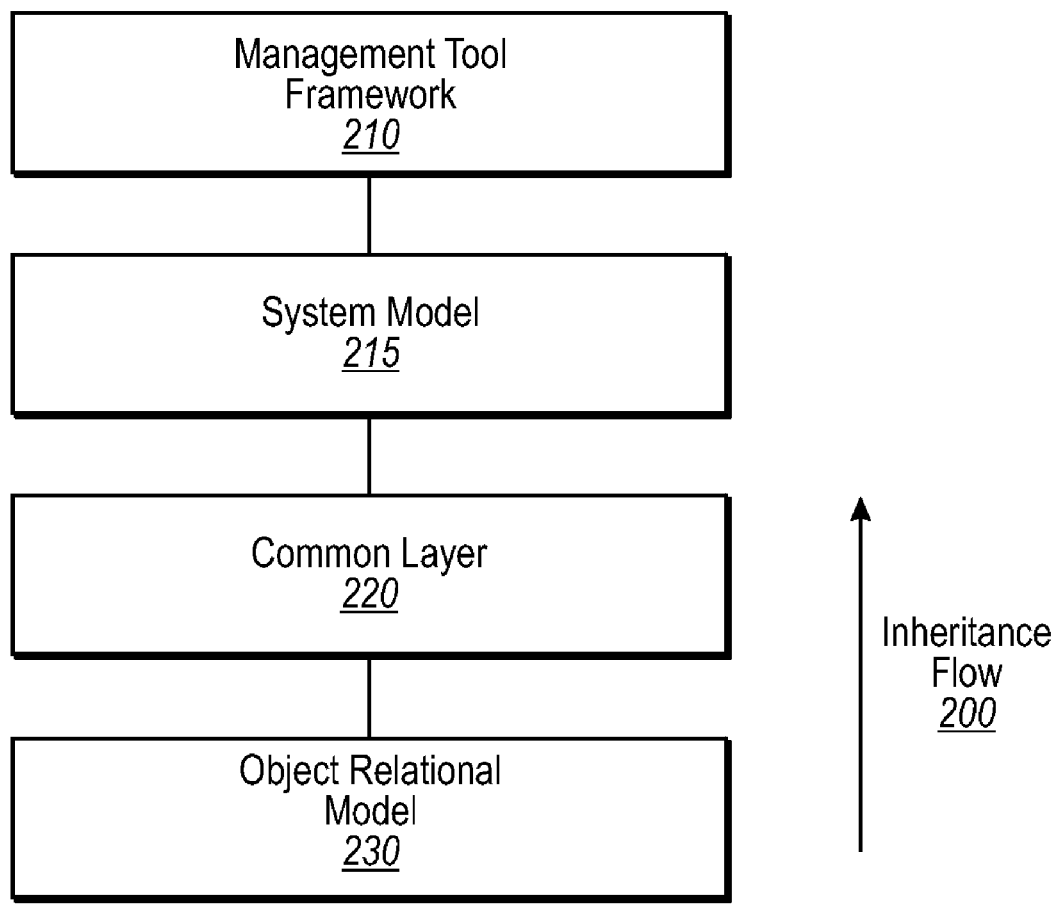
FIG. 2 illustrates the general layer and inherency flow of a management tool in accordance with example embodiments.

As somewhat mentioned above, embodiments herein are based on a hierarchical object-relational model of various layers that inherent from one another. FIG. 2 shows the layering and inheritance flow 200 for the various layers within exemplary embodiments described herein. At the lowest layer, is the object-relational model 230, which provides the model of objects, settings, relationship, parts, attributes, connectors, etc. A common layer 220 inherits from the object model 230 and adds specific relation types with semantics provided by some rules and applications (as described in greater detail below). The system model 215 further adds the specific classes to support the management tool framework 210, which adds concepts that are to do with the UI building on the lower layers, that is the overall object-relational model.

The following describes in greater detail some of the above embodiments of the management tool 115 with regard to specific types 190 in a role type space 105. Note that although various interfaces, specific code, specific role types, and other details are given, such information is equally applicable to other types outside of roles. Accordingly, the use of a roles type, any reference to a specific role, coded interfaces, or other components described herein are for illustrative purposes only and are not meant to limit or otherwise narrow embodiments unless explicitly claimed.

Figure 3:
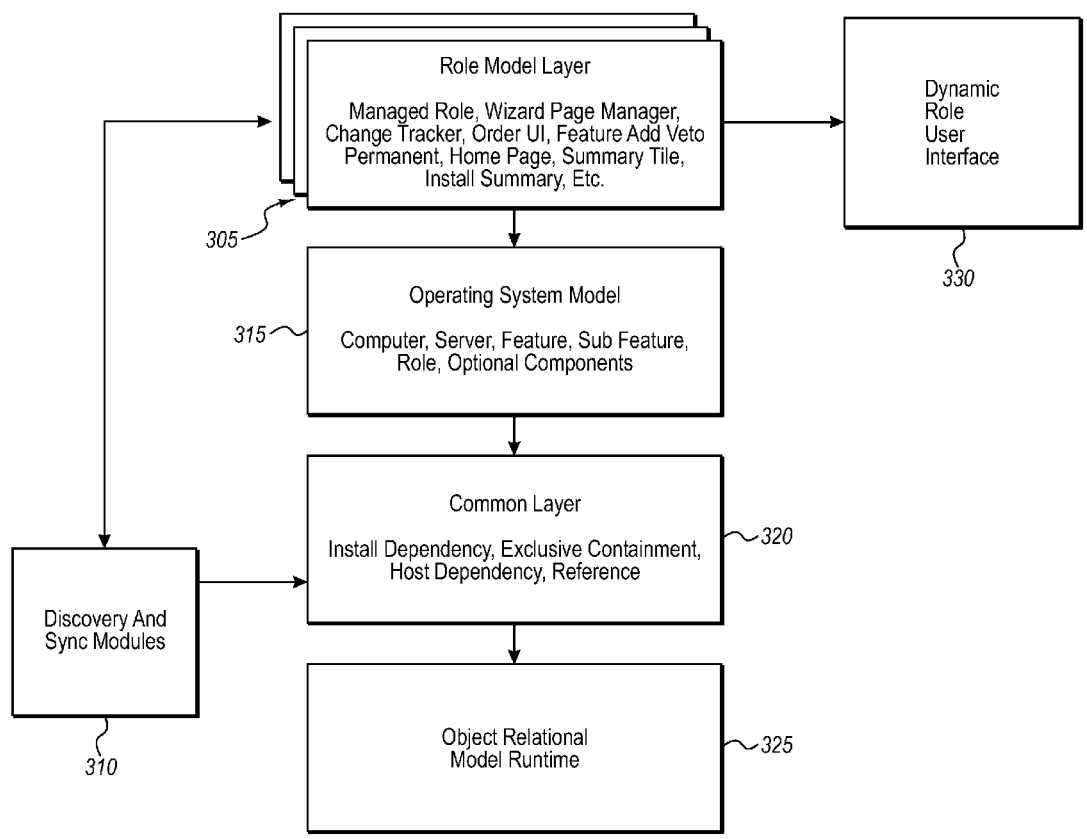
FIG. 3 illustrates the hierarchical relationship of a role management tool based on an object-relational model in accordance with example embodiments.

FIG. 3 illustrates various layers within an object-relational model that can be used when dynamically generating UI for a role management tool. As shown in FIG. 3, an object-relational model runtime layer 325 provides a meta-model with such things as objects, settings, relations, parts, attributes, connectors, etc. On top of this object-relational model runtime 325, common layer 320 adds specific relation types with semantics provided by some rules and the discovery and sync object-relational (e.g., SDM) transformation applications. For example, this layer 320 provides an install dependency that defines a particular order over objects that are synced, which may be a primary relation used by a sync module 310. This layer 320 may also provide a host dependency, which may provide the primary relationship used by discovery module 310.

The host discovery may further be separated into various phases. For example, a first discovery phase may discover parts that use the host dependency or a derived type; a second phase may then flush out and populate this basic tree of objects with values and other parts. Note that this may be a tree where each object has a single host while using host dependency identity semantics are typically not provided. Host dependency is often described as the "where is" relationship, which describes where an object is in the runtime. For example, a file is hosted in a directory that is hosted in a directory, hosted on a volume, hosted on an operating system, hosted on a PC, hosted in a rack, in a room, etc.

More specifically, the list of possible roles for a distributed system may be determined by examining the system for role assemblies, which can then be loaded into the modeling infrastructure. The infrastructure is able to determine which of the roles in the lists of assemblies are valid for the current operating system, as well as which are already installed. When a role is discovered as installed on the system the management tool console (as will be described below) creates a node in the console's tree for the role. The role management tool may then use a role management interface (as described below) for associating such things as a homepage for the specific role (e.g., printer, web server, etc.) with the node in the tree.

The management tool common layer 320 may also include an exclusive containment, which may give a common relationship used to convey that an object is part of only one whole. The semantics for this relation typically come from all modelers using such common relationship and an acyclic property may be enforced in an object-relational (e.g., SDM) store. The reference in the common layer 320 is a common relationship used when you do not wish to create a new relationship type. Note that there may be no semantics that come with relationship, but higher layers in the management tool can refer to it to define modeling conventions.

The operating system layer 315 adds specific model classes to support the role management tool infrastructure. These include: (1) computer, which forms the root of discovery; (2) server, which forms one of the first real models from this basic root where there needs to be differentiation of the host features (e.g., roles and optional components) due to different server types by using relationship types; (3) roles and optional components, which may be features that are hosted upon a server as parts of the same server; and (4) others.

These first three layers 315, 320, 325 comprise the composite object-relational model or structure that the role management tool may be built on top of. Using, however, these types of layers may not be totally sufficient. That is, embodiments provide that the management tool UI uses not just these object-relational types but normally expects certain conventions to be used to encode other information. For example, the management tool uses type space queries based on the type of operating system server discovered to determine which features, roles, optional components, etc., can be installed on that flavor and/or version of operating system server.

As previously mentioned, in addition to discovery mechanisms, the operating system model (and other models) also includes a dependency feature. As such, the role management infrastructure can use a convention where root level features (roles and optional components directly hosted by, e.g., a flavor of operating server) reference other root level features and then declare connectors between their own parts and the parts of the referenced features to express an installation dependency. Of course, there may be other types of discovery and dependencies defined; and therefore the use of discovery for flavor and/or version compatibility and installation dependency types are used herein for illustrative purposes only.

As mentioned above, embodiments also provide a role model layer 305, which adds concepts that are to do with UI building on the lower layers 315, 320, and 325. This layer may include a managed role interface (similar to the managed type interface 165 previously described) that enables the retrieval of object-relational information such as metadata and metadata behavior for specific types of roles. For example, the managed role interface can be used to get the runtime (e.g., common language runtime (CLR)) type for its role management home page; the runtime type for its role summary tile; and interface to get summary information to display in a portion of the management tool (e.g., a wizard). In addition, the managed role interface can be used to get more complex objects or code such as a wizard page manager object, which can be used to implement what is needed to participate in the various role management wizards (e.g., add role, remove role; add role services; remove roles services, add optional features, remove optional features, etc.). This object-relational information can then be used to generate the dynamic role user interface 330 based on, e.g., the metadata, metadata behaviors, code, and other object-relational models as previously described.

For example, FIGS. 4A-4E illustrates various user interfaces, which can be used in practicing various embodiments of the role management tool described above. It should be noted that in each of the following user interfaces there are various designs, features, and objects for accomplishing one or more of the functions associated with the example embodiments of the present invention. There exists, however, numerous alternative user interface designs bearing different aesthetic aspects for accomplishing these functions. Accordingly, the aesthetic layout of the user interface for FIGS. 4A-4E—as well as the graphical objects described therein—are used for illustrative purposes only and are not meant to limit or otherwise narrow the scope of embodiments described herein.

Figure 4A:
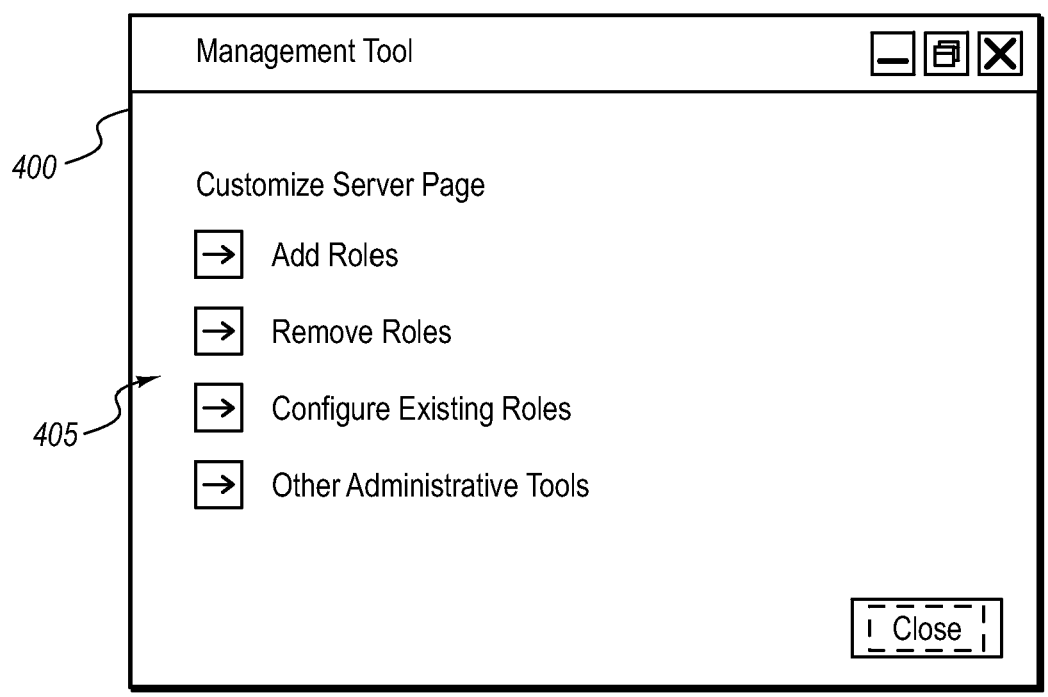
FIG. 4A illustrates a management tool user interface that allows for the configuring of role in accordance with example embodiments.

As shown in FIG. 4A, object-relational information may be used to dynamically generate the management tool UI 400, which lists the types of role management wizards 405 available. In other words, the framework may define in the contract that in order to implement a role, a developer needs to define its role with object-relational information (e.g., code, pages, etc.) for wizards that add, remove, and configure existing roles. In addition, the management tool UI 400 may allow for the selection of other administrative tools, which may be defined by the role developer or by the contract. Note that this object-relational information used to organize and dynamically display the features for the various wizards may also come from the specific type—depending on such things as how the model is defined and how much coded knowledge the infrastructure has about role functionality. It should also be noted that while a management console typically only shows information about roles that are already installed, other embodiments also provide entry points for the user to bring up wizard for adding and removing roles and parts of roles.

Figure 4B:
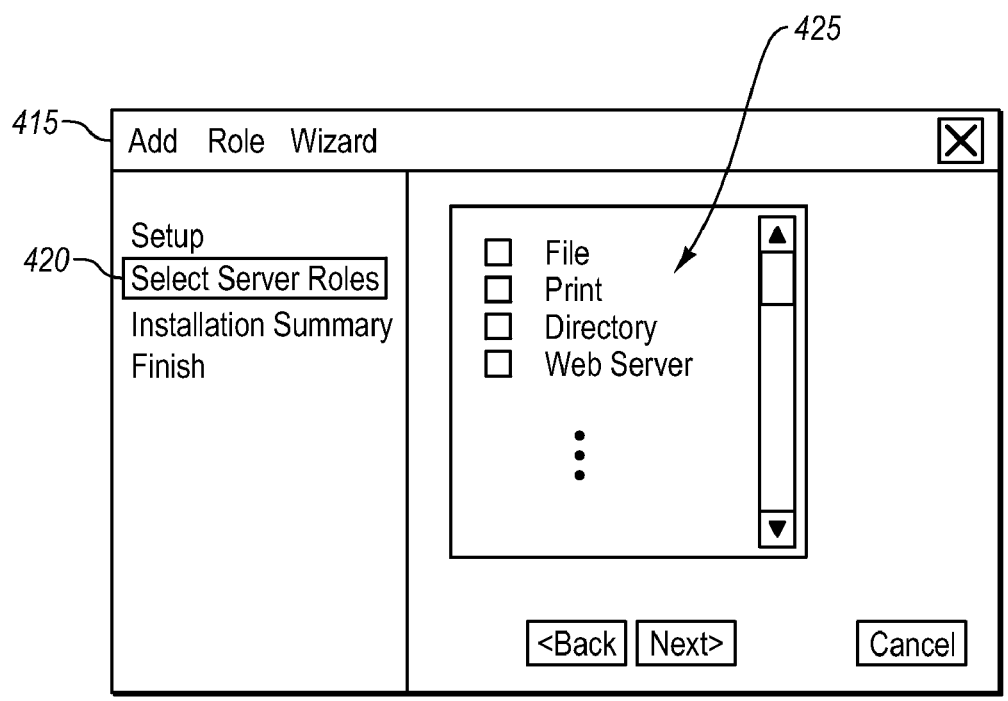
FIG. 4B illustrates an add role wizard for selecting roles in a distributed system in accordance with example embodiments.

In any event, when a user selects one of the objects for manipulating or otherwise managing a role, the discovery control and/or other mechanisms as previously described may be invoked for identifying other object-relational information for assisting in dynamic generation of the next UI display. For example, if the add roles object is selected in FIG. 4A, the wizard for adding roles can go back to the infrastructure to get the list of all roles on the system. From that list of roles, a role metadata attribute or other object-relational information for each role can be obtained. The role metadata attribute may have, e.g., a property on it for determining the role name and/or an icon associated with each role. As a specific example, FIG. 4B shows specific roles and their names of file, print, directory, web server, and other name objects 425, which may be displayed as tiles for further user interaction. In addition to a name, order metadata may also be retrieved specifying the position of the role in the list of available roles. This allows the wizard to order the available roles in the same order every time the user sees the add role (or other) wizard.

Of course, there may be other object-relational information (e.g., metadata and metadata behavior) that can also be used when displaying the list of roles. For example, a role may declare itself to be permanent, so that the user would not be able to remove it in the wizard for removing roles. Similarly, only those roles that are available for installation depending on such things as the flavor and/or version of the operating system or other conditions may also declare specifically what roles may be displayed.

In other words, as described above, when a role is discovered as installed on the system (e.g., through the execution of an object like the add roles wizard), the management tool console can create a node in the console's tree for the role. In addition, the management tool may then associate a homepage (and/or other information) from the managed role interface for the specific role with the node in the tree. The management tool can also create a homepage (shown here as add role wizard 415) of its own for showing summary information. More specifically, the role summary homepage may have a tile (e.g., name or other icon) from each role added to it. Further, the role summary home page may include other information such as role status (e.g., installed, uninstalled, etc.), the steps and/or current step in the wizard (e.g., select server roles 420), etc.), or any other relevant information (e.g., check boxes for allowing selection of those roles to install). Note that the role tile and role homepage are typically authored entirely by the role developer, but are shown in the context of the broader management console.

Acting as a feature in the wizard is not simple mostly because of the interaction between features in dependencies. For starters, roles will typically agree on an order in the wizard where no role will add a role (because sometimes it depends on it) that occurs before it in the wizard. Accordingly, roles may be told when features are added or removed and embodiments give the roles the option to veto the addition or take other appropriate action. Further, pages added to the wizard should be able to handle other features being added and removed. As such, there may be considerable code in the wizard or controls for tracking the changes in the features and otherwise dynamically displaying rich UI based on the object-relational model.

Figure 4C:
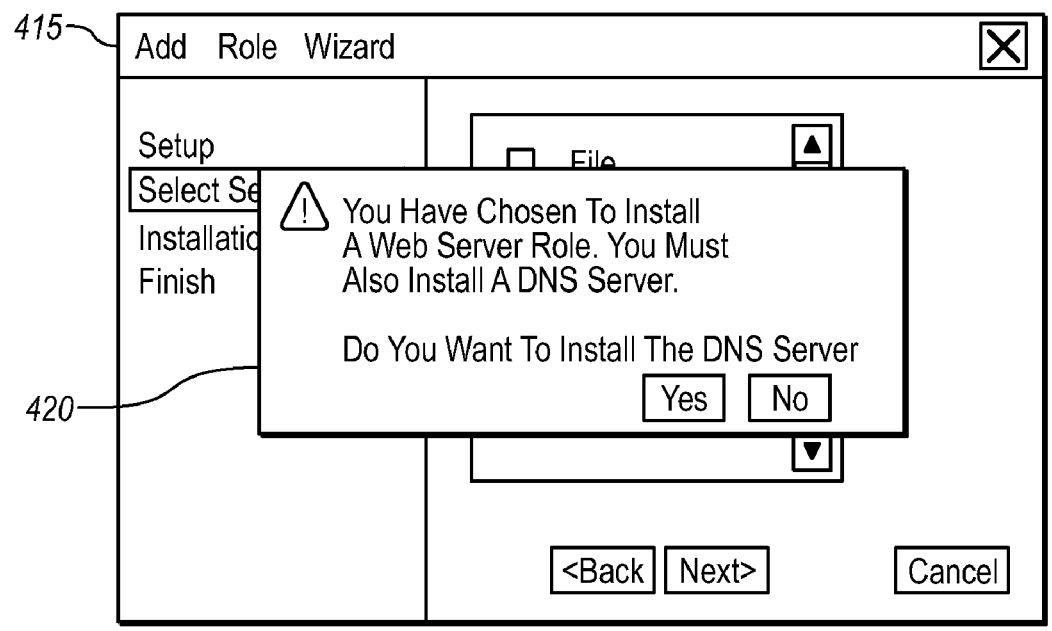
FIG. 4C illustrates a dynamically generated user interface for the add role wizard based on dependencies in accordance with example embodiments.

For example, the object-relational information may include role metadata behavior such as a method (e.g., confirm action or veto) on it for confirming each feature that is added. This may allow the author of a role to set restrictions on the sub-features of that role, or on other roles. For example, if Role A cannot be installed with Role B, the author of Role A could implement the confirm action or veto method to say that if Role A is installed or being installed, selecting Role B should cause a veto to take place. As a specific example, FIG. 4C shows a UI that was dynamically generated based on the object-relational confirm action or veto method, which generates dialog or popup display 420 requesting the user to confirm the installation of a DNS server that has a direct relationship with the web server role. If a user chooses not to add the DNS server, then the Web Server role may veto the installation. Of course, other actions and restrictions are also possible. For example, confirm action or veto method can also be used for restrictions on other parts of the system, for example a role could veto adding itself unless the system was joined to a domain.

In the wizards, whenever a role is selected to have an action performed on it (addition or removal of the role, or addition or removal of sub-features of the role), the managed role interface may be queried to provide an implementation of the wizard page manager interface. The wizard page manager interface allows (among other things) the role to provide a list of pages that the wizard should show for that role. Accordingly, the role management wizards can show configuration pages for a role without any specific knowledge of the role. The role can change which pages are shown whenever it likes (almost always in response to the user adding or removing a sub-feature of the role), and then notify the wizard to refresh the pages that are shown for that role.

Figure 4D:
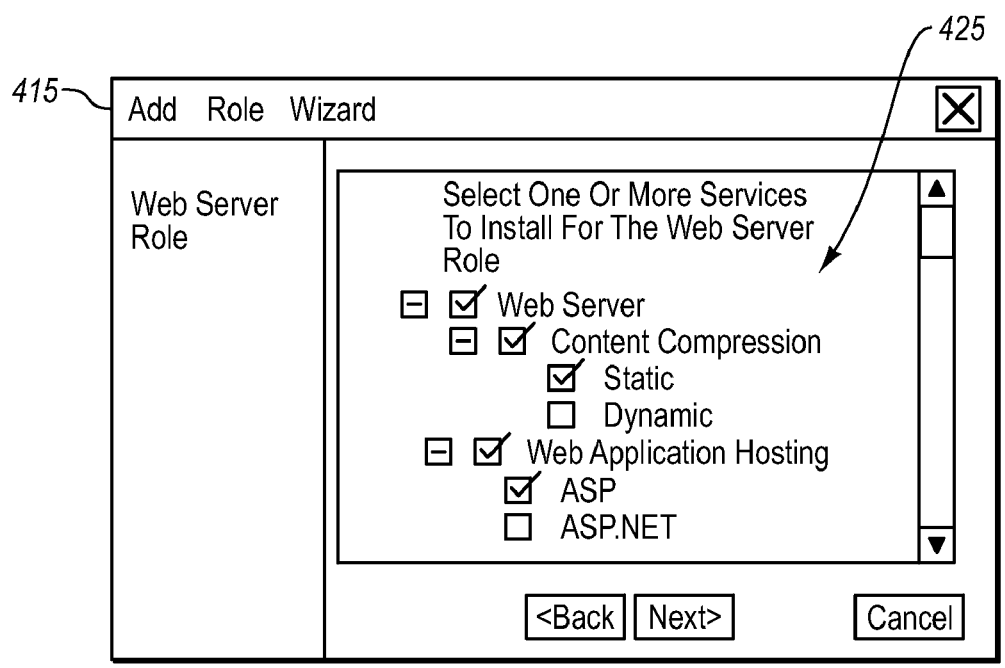
FIG. 4D illustrates a dynamically generated user interface for an add role wizard that shows a hierarchical relationship between components in accordance with example embodiments.

For example, FIG. 4D shows an example UI dynamically generated within the add role wizard 415 after the web server role was selected for installation. Note that various objects or tiles within the UI can be dynamically generated and populated with information based on not only features provided, but relationships between the objects and other object-relation information obtained as previously described. For example, discovery and other controls can be used to obtain object-relational information about existing features offered, objects available based on system versioning, features already installed, dependencies on other objects or features, etc. This information can then be used to show the various features and the relationships therein using, e.g., a hierarchical tree 425 that can be expanded, collapsed, or otherwise manipulated as allowable by the wizard controls.

Each wizard will typically operate on a single object-relational session, manipulating the instances until the user action is committed (sync is called) or the operation is abandoned. Note that the results of the sync drive the progress and results pages in the wizards. One of the last pieces of object-relational information used to dynamically generate UI is the get summary method, which can be used at the end of the wizard to give the user a summary of the changes that are about to be made to the system. This may be the addition or removal of a role or role sub-features, or it may be configuration changes within a role. The get summary method allows the role developers to put whatever information into that summary that they believe might be useful for the administrator or user, including warnings, configuration information, and so on.

Figure 4E:
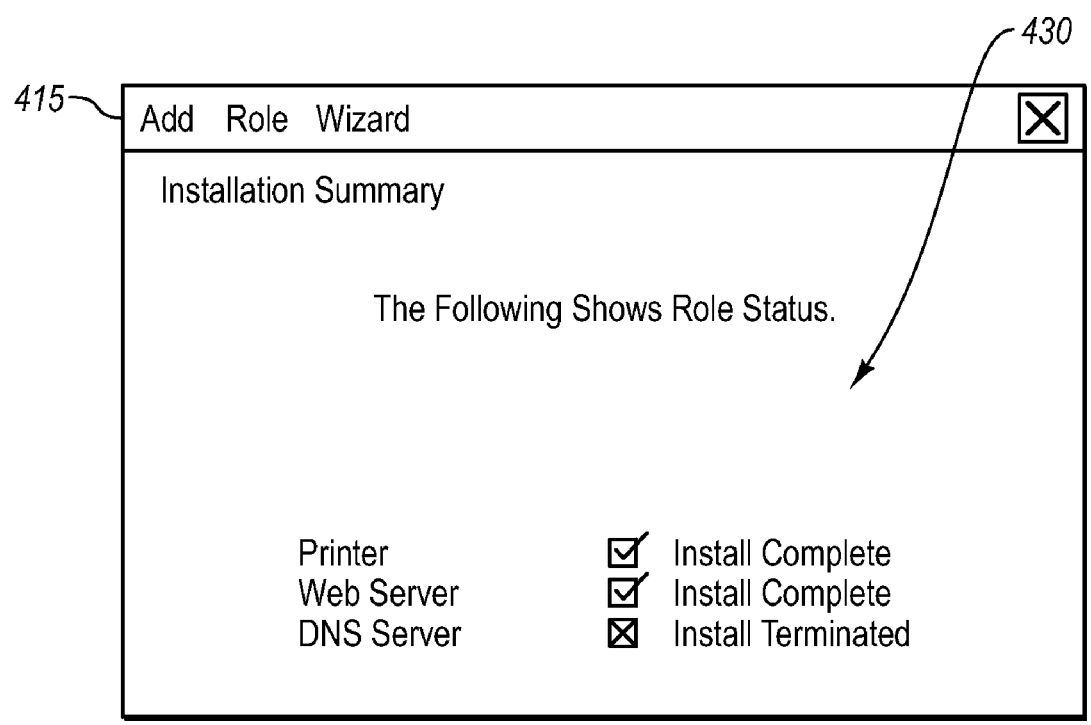
FIG. 4E illustrates an installation summary for an add role wizard user interface that can dynamically be generated in accordance with example embodiments.

For example, FIG. 4E illustrates a add role wizard 415 summary page, which may be dynamically generated based on those roles installed and the status of each desired installation. As such, tiles 430 for those roles that were activated for installation may be populated with such information as name of the role added, status of installation, (e.g., install complete/terminated), as well as other configuration information and/or warnings.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagram for FIG. 5—is used to indicate the desired specific use of such terms.

Figure 5:
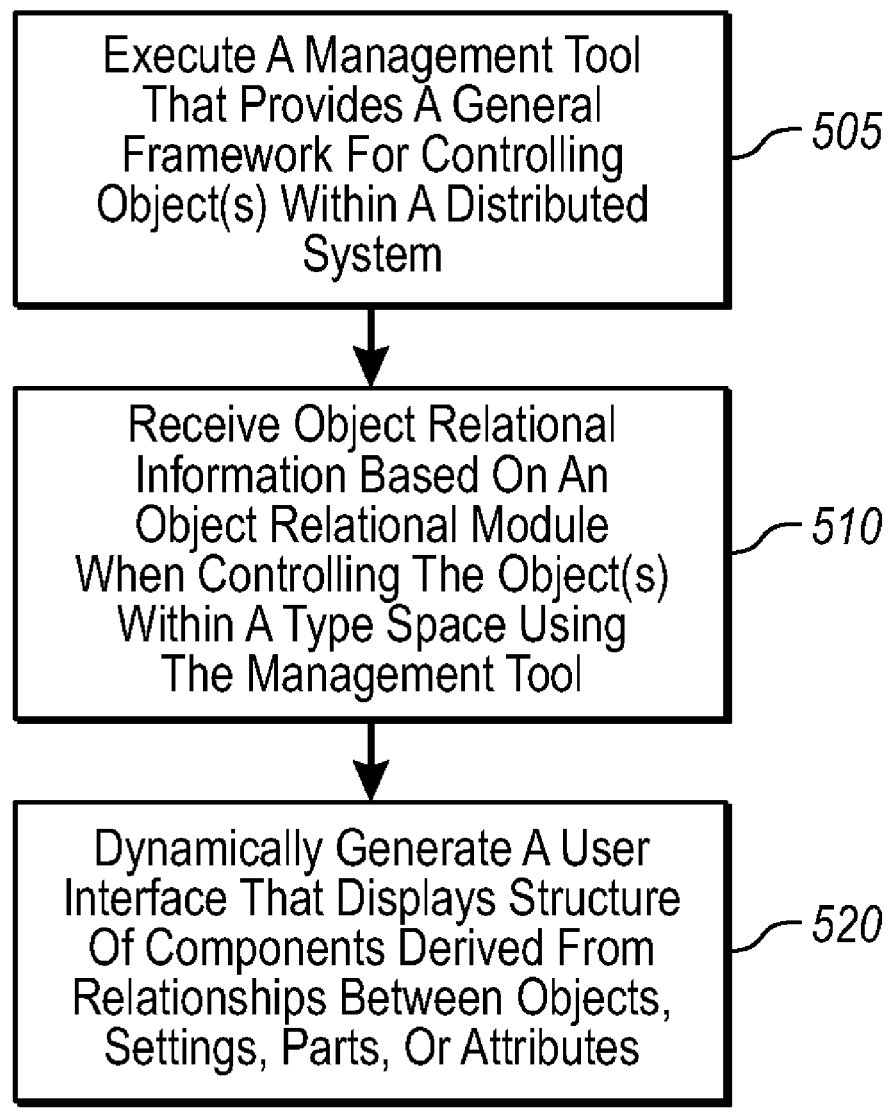
FIG. 5 illustrates of a flow diagram for a method of providing a user interface for a management tool based on an object-relational model in accordance with exemplary embodiments.

As previously mentioned, FIG. 5 illustrates a flow diagram for various exemplary embodiments of the present invention. The following description of FIG. 5 will occasionally refer to corresponding elements from FIGS. 1, 2, 3, and 4A-4E. Although reference may be made to a specific element from these Figures, such references are used for illustrative purposes only and are not meant to limit or otherwise narrow the scope of the described embodiments unless explicitly claimed.

FIG. 5 illustrates a flow diagram for a method 500 of providing a user interface based on an object-relational model in order to allow for ease in extending the management tool. Note that the method 500 is typically performed within a computing system that uses a management tool for configuration, state monitoring, system extensions, or other administrative tasks corresponding to various objects within a distributed environment of related hardware resources and/or software resources. Method 500 includes an act of executing 505 a management tool that provides a general framework for controlling object(s) within a distributed system. For example, management tool 115 may include a general framework 210, which is part of a hierarchical layered system built on top of an object-relational model 215, 220, 230 that defines relationships between objects, settings, parts, and/or attributes within and across various types 190 within a type space 105 of the distributed system 100. Note that the object-relational model may be based or defined by a system definition model (SDM).

Method 500 also includes an act of receiving 510 object-relational information based on the object-relational model when controlling the object(s) within the type space using the management tool. For example, management tool 115 may receive object-relational information 145, 195 using the managed type interface when controlling object(s) within the type space 105. Typically, at least a portion of the object-relational information 195 is received from type specific 195, 145 metadata 116 or code 102 developed outside the general framework 115. More specifically, the object-relational information 145, 195 received may be metadata 116, or metadata attributes (e.g., UI order 108), a wizard page tool 102, type specific pages 415, summary information 430 of configuration changes, available specific types 190, etc.

Based on the received object-relational information, method 500 also includes as step for dynamically generating 520 a user interface that displays structure of components derived from relationships between the objects, settings, parts, and/or attributes. More specifically, display module 155 may receive object-relational information 145 and other info 150 for dynamically generating component structured UI display 180 derived from relationships between the objects, settings, parts, and/or attributes. Note that this UI 180 generation occurs without requiring the general framework 115 to have encoded therein specific knowledge of the types, relationships, and what should be displayed such that changes to specific types 190 in the type space 105 do not require a change to the general framework.

In one embodiment, the UI 180 shows a hierarchical relationship between objects representing specific types 190 within the type space 105. For instance, this hierarchical relationship may show relationships between features offered by a role or other component (e.g., as shown in FIG. 4D for a web server) or among the various roles within a system.

In another embodiment, the structure of components derived displays UI 180 instructions on dependencies of objects within the type space 105 that give a user 185 options to accept or decline installation of types 190 within the type space 105 that have a relationship based on the dependencies. For example, as shown in FIG. 4C, a DNS server role may have a confirm or veto action method that requires that if the web server role is added, it too must be added. As such, dialog or popup 420 can be dynamically generated to give a user 185 the option to install both or abort installation.

Note that in another embodiment the framework 115 may not have encoded therein any knowledge of a base type (e.g., role) within the type space 105 for which a runtime instance of a specific type derives from and the user interface 180 displayed is a general grid like structure configured to show general relationships between the one or more objects, settings, parts, and/or attributes. In another embodiment, however, the framework is encoded with knowledge of a base type (e.g., role) within the type space 105 for which the specific type 190 derives from and the user interface 180 displayed includes rich relational information of the components derived from the relationships between the objects, settings, parts, and/or attributes.

In another embodiment, the components derived for display within the user interface 180 may be part of a discovery 130 mechanism that provides a list of available specific types 190 of a base type (e.g., a role) within the distributed system 100. In such case, method 500 described above may further include an act of receiving user 185 input selecting specific type(s) 190 from the available specific displayed for taking action thereon (e.g., selecting of an add role from the list of add role, remove role, configuration of existing role, etc.). Based on the action, the method 500 may further include launching a wizard type application (e.g., add role) by calling the code (e.g., wizard page tool 102) developed outside of the framework 155. The wizard tool can then display a series of configuration pages (e.g., type specific pages 112) to the user 185 for management of the specific type(s) 190 (e.g., file system, printer system, DNS server, etc.) selected such that the framework that displays the configuration pages does not have any encoded knowledge about the content thereof in order to allow a developer of the specific types 190 control over the management user 185 experience.

Note that in one embodiment, the action may be the user selecting to add, remove, or modify the specific type 190. After running the wizard type application 102 and receiving configuration instructions from the user 185, a sync 310 action may be received that commits the changes made to instances of the specific types 190, which results in the display of a summary page (e.g., add role summary page 425) showing changes made to the specific types.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system that uses a management tool for configuration, state monitoring, system extensions, and other administrative tasks corresponding to various objects within a distributed environment of related hardware resources, software resources, or both, a method of providing a user interface for the management tool based on an object-relational model in order to allow for ease in extending the management tool, when executed by one or more processors of the computing system, cause the computing system to perform the following:

the method comprising:

executing a management tool that provides a general framework for controlling one or more objects within a distributed system, wherein the general framework is part of a hierarchical layered system built on top of an object-relational model, which defines relationships between one or more objects, settings, parts, and attributes within and across various types within a type space of the distributed system;

receiving object-relational information based on the object-relational model when controlling the one or more objects within the type space using the management tool, wherein at least a portion of the object-relational information is received from type specific metadata or code developed outside the general framework, and wherein the object-relational information received is one or more of metadata, metadata attributes, wizard page tool, type specific pages, summary information of configuration changes, and available specific types; and based on the received object-relational information, dynamically generating a user interface that displays structure of components derived from relationships between the one or more objects, settings, parts, and attributes, without requiring the general framework to have encoded therein specific knowledge of the types, relationships, and what should be displayed such that changes to specific types in the type space do not require a change to the general framework.

2. The method of claim 1, wherein the object-relational model is defined by a system definition model (SDM).

3. The method of claim 1, wherein the components derived for display within the user interface are part of a discovery mechanism that provides a list of available specific types of a base type within the distributed system, and wherein the method further comprises: receiving user input selecting one or more specific types from the available specific types displayed for taking action thereon; and based on the action, launching a wizard type application by calling the code developed outside of the framework, which displays a series of configuration pages to the user for management of the one or more specific types selected such that the framework that displays the configuration pages does not have any encoded knowledge about the content thereof in order to allow a developer of the specific types control over the management user experience.

4. The method of claim 3, wherein the action is one or more of an add, a remove, or a modify operation for the specific type.

5. The method of claim 3, wherein after running the wizard type application and receiving configuration instructions from the user, a sync action is received that commits the changes made to instances of the one or more specific types, which results in the display of a summary page showing changes made to the one or more specific types.

6. The method of claim 1, wherein the user interface shows a hierarchical relationship between objects representing specific types within the type space.

7. The method of claim 1, wherein the structure of components derived displays instructions on dependencies of objects within the type space that give a user options to accept or decline installation of a plurality of types within the type space that have a relationship based on the dependencies.

8. The method of claim 1, wherein the framework also does not have encoded therein any knowledge of a base type within the type space for which a runtime instance of a specific type derives from, and wherein the user interface displayed is a general grid like structure configured to show general relationships between the one or more objects, settings, parts, or attributes.

9. The method of claim 1, wherein the framework is encoded with knowledge of a base type within the type space for which the specific type derives from, and wherein the user interface displayed includes rich relational information of the components derived from the relationships between the one or more objects, settings, parts, or attributes.

10. The method of claim 1 wherein the object-relational information received is metadata.

11. The method of claim 1 wherein the object-relational information received is metadata attributes.

12. The method of claim 1 wherein the object-relational information received is a wizard page tool.

13. The method of claim 1 wherein the object-relational information received is type specific pages.

14. The method of claim 1 wherein the object-relational information received is summary information of configuration changes.

15. The method of claim 1 wherein the object-relational information received is available specific types.

16. In a computing system that uses a management tool for configuration, state monitoring, system extensions, and other administrative tasks corresponding to various objects within a distributed environment of related hardware resources, software resources, or both, a computer program product for implementing a method of providing a user interface for the management tool based on an object-relational model in order to allow for ease in extending the management tool, the computer program product comprising one or more computer-readable storage media having stored thereon computer-executable instructions that, when executed by one or more processors of the computing system, cause the computing system to perform the following:

execute a management tool that provides a general framework for controlling one or more objects within a distributed system, wherein the general framework is part of a hierarchical layered system built on top of an object-relational model, which defines relationships between one or more objects, settings, parts, and attributes within and across various types within a type space of the distributed system;

receive object-relational information based on the object-relational model when controlling the one or more objects within the type space using the management tool, wherein at least a portion of the object-relational information is received from type specific metadata or code developed outside the general framework, and wherein the object-relational information received is one or more of metadata, metadata attributes, wizard page tool, type specific pages, summary information of configuration changes, and available specific types from a base type; and based on the received object-relational information, dynamically generate a user interface that displays structure of components derived from relationships between the one or more objects, settings, parts, and attributes, without requiring the general framework to have encoded therein specific knowledge of the types, relationships, and what should be displayed such that changes to specific types in the type space do not require a change to the general framework.

17. The computer program product of claim 16, wherein the object-relational model is defined by a system definition model (SDM).

18. The computer program product of claim 16, wherein the components derived for display within the user interface are part of a discovery mechanism that provides a list of available specific types of a base type within the distributed system, and wherein the computer program product further includes computer-executable instructions that, when executed by one or more processors of the computing system, cause the computing system to perform the following: receive user input selecting one or more specific types from the available specific displayed for taking action thereon; and based on the action, launch a wizard type application by calling the code developed outside of the framework, which displays a series of configuration pages to the user for management of the one or more specific types selected such that the framework that displays the configuration pages does not have any encoded knowledge about the content thereof in order to allow a developer of the specific types control over the management user experience.

19. The computer program product of claim 18, wherein the action is one or more of an add, a remove, or a modify operation for the specific type.

20. The computer program product of claim 18, wherein after running the wizard type application and receiving configuration instructions from the user, a sync action is received that commits the changes made to instances of the one or more specific types, which results in the display of a summary page showing changes made to the one or more specific type.

21. The computer program product of claim 16, wherein the user interface shows a hierarchical relationship between objects representing specific types within the type space.

22. The computer program product of claim 16, wherein the structure of components derived displays instructions on dependencies of objects within the type space that give a user options to accept or decline installation of a plurality of types within the type space that have a relationship based on the dependencies.

23. The computer program product of claim 16, wherein the framework also does not have encoded therein any knowledge of a base type within the type space for which a runtime instance of a specific type derives from, and wherein the user interface displayed is a general grid like structure configured to show general relationships between the one or more objects, settings, parts, or attributes.

24. The computer program product of claim 16, wherein the framework is encoded with knowledge of a base type within the type space for which the specific type derives from, and wherein the user interface displayed includes rich relational information of the components derived from the relationships between the one or more objects, settings, parts, or attributes.

25. A computing system that uses a management tool for configuration, state monitoring, system extensions, and other administrative tasks corresponding to various objects within a distributed environment of related hardware resources, software resources, or both, the system comprising:

a processor; and memory having stored computer-executable instructions which when executed by the processor perform a method of providing a user interface for the management tool based on an object-relational model in order to allow for ease in extending the management tool, the method comprising:

executing a management tool that provides a general framework for controlling one or more objects within a distributed system, wherein the general framework is part of a hierarchical layered system built on top of an object-relational model, which defines relationships between one or more objects, settings, parts, and attributes within and across various types within a type space of the distributed system;

receiving object-relational information based on the object-relational model when controlling the one or more objects within the type space using the management tool, wherein at least a portion of the object-relational information is received from type specific metadata or code developed outside the general framework, and wherein the object-relational information received is one or more of metadata, metadata attributes, wizard page tool, type specific pages, summary information of configuration changes, and available specific types; and based on the received object-relational information, dynamically generating a user interface that displays structure of components derived from relationships between the one or more objects, settings, parts, and attributes, without requiring the general framework to have encoded therein specific knowledge of the types, relationships, and what should be displayed such that changes to specific types in the type space do not require a change to the general framework.

26. The system of claim 25, wherein the components derived for display within the user interface are part of a discovery mechanism that provides a list of available specific types of a base type within the distributed system, and wherein the computer program product further includes computer-executable instructions that, when executed by one or more processors of the computing system, cause the computing system to perform the following: receive user input selecting one or more specific types from the available specific displayed for taking action thereon; and based on the action, launch a wizard type application by calling the code developed outside of the framework, which displays a series of configuration pages to the user for management of the one or more specific types selected such that the framework that displays the configuration pages does not have any encoded knowledge about the content thereof in order to allow a developer of the specific types control over the management user experience.

* * * * *